US007968144B2

(12) United States Patent
James et al.

(10) Patent No.: US 7,968,144 B2
(45) **Date of Patent: *Jun. 28, 2011**

(54) SYSTEM FOR APPLYING A CONTINUOUS SURFACE LAYER ON POROUS SUBSTRUCTURES OF TURBINE AIRFOILS

(75) Inventors: Allister W. James, Orlando, FL (US); Douglas J. Arrell, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1342 days.

This patent is subject to a terminal disclaimer.

(21) Appl. No.: 11/784,982

(22) Filed: Apr. 10, 2007

(65) Prior Publication Data

US 2008/0254276 A1 Oct. 16, 2008

(51) Int. Cl.

| | |
|---|---|
| ***B05D 3/00*** | (2006.01) |
| ***B05D 3/10*** | (2006.01) |
| ***B05D 1/02*** | (2006.01) |
| ***B23P 15/02*** | (2006.01) |
| *B32B 5/18* | (2006.01) |

(52) U.S. Cl. ..... 427/180; 427/244; 427/309; 427/421.1; 29/889.71; 29/527.2; 29/530; 428/550; 428/613; 428/609; 428/307.7

(58) Field of Classification Search ........................ None
See application file for complete search history.

(56) References Cited

U.S. PATENT DOCUMENTS

| | | | | |
|---|---|---|---|---|
| 2,686,654 | A * | 8/1954 | Roush | 428/551 |
| 3,138,857 | A * | 6/1964 | Kuchek | 29/423 |
| 3,210,166 | A * | 10/1965 | Carlson | 428/613 |
| 3,275,424 | A * | 9/1966 | Kuchek | 428/613 |
| 3,466,232 | A * | 9/1969 | Francis et al. | 205/168 |
| 3,549,423 | A * | 12/1970 | Grubb et al. | 29/623.3 |
| 3,632,704 | A * | 1/1972 | Coll-Palagos et al. | 264/49 |
| 3,711,363 | A * | 1/1973 | Jarema et al. | 428/613 |
| 4,068,025 | A * | 1/1978 | Sahm | 427/309 |
| 4,608,319 | A * | 8/1986 | Croopnick et al. | 428/613 |
| 5,535,810 | A * | 7/1996 | Compton et al. | 164/35 |
| 5,985,368 | A | 11/1999 | Sangeeta et al. | |
| 6,412,541 | B2 | 7/2002 | Roesler et al. | |
| 6,428,280 | B1 * | 8/2002 | Austin et al. | 416/241 B |
| 6,444,331 | B2 | 9/2002 | Ritter et al. | |
| 6,916,529 | B2 | 7/2005 | Pabla et al. | |
| 7,070,853 | B2 | 7/2006 | Paul | |
| 7,134,477 | B2 | 11/2006 | Dobesberger et al. | |
| 7,150,921 | B2 | 12/2006 | Nelson et al. | |
| 2005/0013933 | A1 * | 1/2005 | Chen et al. | 427/181 |
| 2005/0015964 | A1 | 1/2005 | Prociw et al. | |
| 2005/0111966 | A1 | 5/2005 | Metheny | |
| 2005/0133910 | A1 * | 6/2005 | Riedl et al. | 257/729 |
| 2005/0153156 | A1 * | 7/2005 | Miyoshi et al. | 428/613 |

(Continued)

FOREIGN PATENT DOCUMENTS

DE 10052404 A1 5/2002

(Continued)

*Primary Examiner* — John J Zimmerman

(57) ABSTRACT

A system for forming a surface coating on an outer surface of a foam for use with cooling system of turbine engines. The system may include removing filler from the outer surface of the foam to expose a porous structure of the foam, whereby portions of the porous structure extend outwardly from a newly formed outer surface of the filler. A surface layer may be applied to the outer surface of the filler and exposed portions of the porous structure, whereby the surface layer is attached to the porous structure at least in part due to mechanical interaction with the portions of the porous structure extending outwardly from the newly formed outer surface of the filler. The filler material may then be removed from the porous structure.

19 Claims, 2 Drawing Sheets

U.S. PATENT DOCUMENTS

| | | | | |
|---|---|---|---|---|
| 2005/0194259 | A1 | 9/2005 | Karl et al. | |
| 2005/0266163 | A1 | 12/2005 | Wortman et al. | |
| 2006/0280926 | A1 | 12/2006 | Spitsberg et al. | |
| 2008/0250641 | A1* | 10/2008 | James et al. | 29/889.71 |

FOREIGN PATENT DOCUMENTS

| | | | | |
|---|---|---|---|---|
| DE | 10052405 | A1 | | 5/2002 |
| JP | 3-45582 | | * | 2/1991 |
| JP | 11181561 | A | | 7/1999 |

* cited by examiner

SYSTEM FOR APPLYING A CONTINUOUS SURFACE LAYER ON POROUS SUBSTRUCTURES OF TURBINE AIRFOILS

FIELD OF THE INVENTION

This invention is directed generally to coatings applied to metal foams, and more particularly to coatings applied to metal foams usable with cooling systems of turbine airfoils.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine vane and blade assemblies to these high temperatures. As a result, turbine vanes and blades must be made of materials capable of withstanding such high temperatures. In addition, turbine vanes and blades often contain cooling systems for prolonging the life of the vanes and blades and reducing the likelihood of failure as a result of excessive temperatures. Many conventional cooling systems of turbine airfoils are formed of the same materials used to form the turbine airfoils. However, different heating loads are typically found throughout a turbine engine and within a cooling system of a turbine engine. Thus, a need exists for different materials that are better suited for forming cooling systems of a turbine engine.

SUMMARY OF THE INVENTION

This invention relates to a coating system for attaching a surface layer to a foam material. In at least one embodiment, the coating system may be usable as a component of a cooling system of a turbine engine. The coating system may include preparing an outer surface of the foam such that at least a portion of the porous structure forming the foam material extends outwardly from a plane in which an outer surface of filler in the foam material resides. The surface layer is attached to the outer surface and to exposed portions of the porous structure, which enables an enhanced mechanical connection between the surface layer and the foam material.

The coating system may be formed with a method of forming a surface coating on an outer surface of foam that includes removing filler from the outer surface of the foam to expose a porous structure of the foam, whereby portions of the porous structure extend outwardly from a newly formed outer surface of the filler. The filler may be removed using an appropriate leaching process. The porous structure may be, but is not limited to being, formed from a nickel based superalloy or FeCrAl. A surface layer may be applied to the outer surface of the filler and to exposed portions of the porous structure, whereby the surface layer is attached to the porous structure at least in part due to mechanical interaction with the portions of the porous structure extending outwardly from the newly formed outer surface of the filler. The surface layer may be applied via spraying or via infiltration of a metallic powder. If a metallic powder is used, the powder may be subjected to a heat treatment or HIPing, or both. In one embodiment, the surface layer may be applied to a single outer surface of the foam. In another embodiment, the surface layer may be applied to two outer surfaces of the porous structure, whereby the two outer surfaces of the porous structure are generally planar and generally opposite to each other. The filler material may then be removed from remaining portions of the porous structure, such as with an appropriate leaching process.

In some embodiments, the foam may not be received with filler within the pores of the material. In such an embodiment, the porous structure may be infiltrated with a removable filler before removing the filler from the outer surface of the foam. The filler may be, but is not limited to being, a ceramic filler.

An advantage of this invention is that at least a portion of the porous structure forming the metal foam may be exposed and protrude from an outer surface of the filler in the foam, thereby enabling the surface layer to be attached to the metal foam, at least in part, due to the mechanical interaction with the portions of the porous structure extending outwardly from the outer surface of the filler. Such a configuration significantly increases the ability of the surface layer to remain attached to the porous structure.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
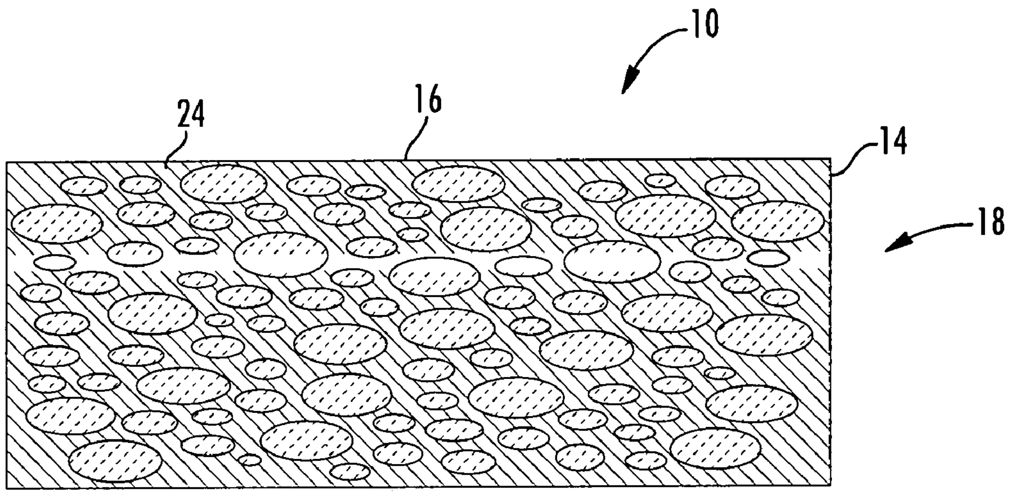
FIG. 1 is a partial cross-sectional view of a fully infiltrated metal foam having aspects of this invention.

As shown in FIGS. 1-4, this invention is directed to a coating system 10 for attaching a surface layer 12 to a foam material 14. In at least one embodiment, the coating system 10 may be usable as a component of a cooling system of a turbine engine. The coating system 10 may include preparing an outer surface 16 of the foam 14 such that at least a portion of the porous structure 18 forming the foam material 14 extends outwardly from a plane 20 in which an outer surface 16 of the foam material 14 resides. The surface layer 12 is attached to the outer surface 16 and exposed portion of the porous structure 18, which enables an enhanced mechanical connection between the surface layer 12 and the foam material 14.

The coating system 10 may include a foam material 14, as shown in FIG. 1. The foam material 14 may include a porous structure 18 in which there exists a plurality of open pores. The porous structure 18 may be formed from a nickel based superalloy, FeCrAl, or other appropriate material. Application of the coating system 10 may first begin by infiltrating the porous structure 18 with a removable filler 24. The filler 24 may be a ceramic material, or other appropriate material, that may be leached to remove the filler 24 at a later stage from the porous structure 18. In some embodiments, the porous structure 18 may be received already infiltrated with filler, and thus the step of infiltrating the porous structure with a filler 24 is not needed. The filler 24 may form the outer surface 16 of the foam material 14 during the formation process.

Figure 2:
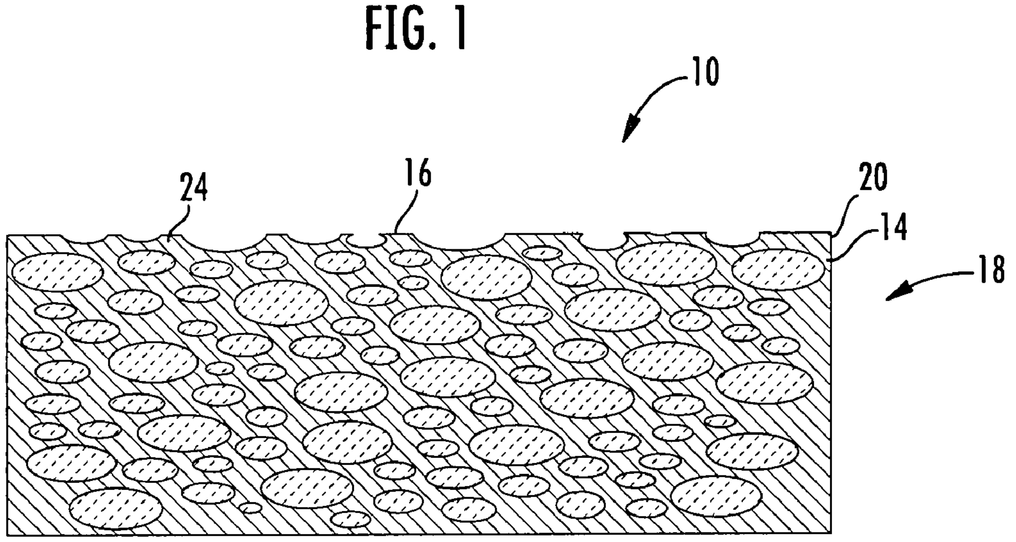
FIG. 2 is a partial cross-sectional view of the metal foam in which a portion of the infiltrate has been removed from an outer surface of the foam to expose portions of the porous structure of the foam that extend outwardly from a new outer surface of the foam.

The next step may include removing the filler 24 from the outer surface 16 of the foam 14 to expose the porous structure 18 of the foam 14, as shown in FIG. 2. The filler 24 at the outer surface 16 may be removed by leaching the filler 24 from the porous structure 18. Portions of the porous structure 18 may extend outwardly from a newly formed outer surface 16 of the filler 24. The filler 24 should be leached sufficiently to expose the porous structure 18 such that there can be mechanical interaction between the porous structure 18 and the material forming the surface layer 12.

Figure 3:
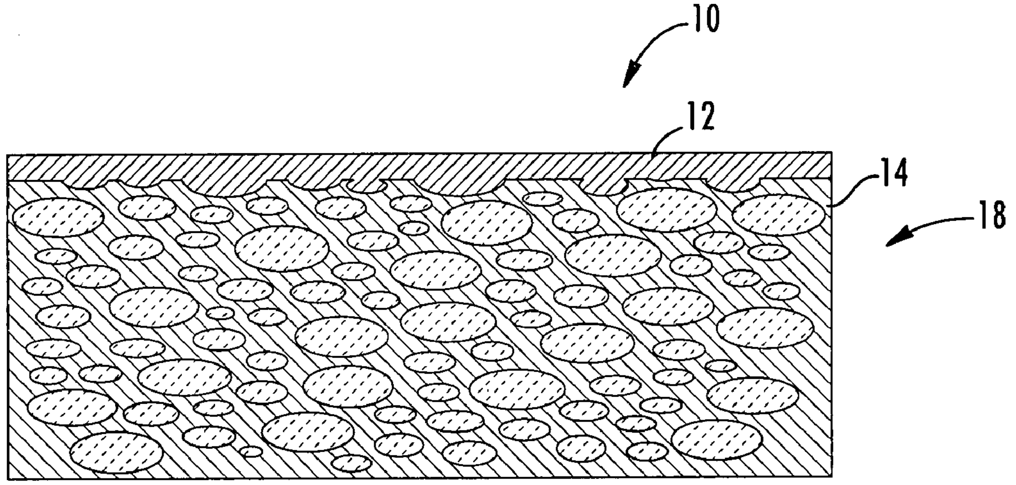
FIG. 3 is a partial cross-sectional view of the metal foam with a surface layer applied thereto, whereby the surface layer is attached to the porous structure at least in part due to mechanical interaction with the portions of the porous structure extending outwardly from the newly formed outer surface of the filler.

A surface layer 12 may then be applied to the outer surface 16 of the filler 24 and exposed portions of the porous structure 18, as shown in FIG. 3. The surface layer 12 may be attached to the porous structure 18 at least in part due to mechanical interaction with the portions of the porous structure 18 extending outwardly from the newly formed outer surface 16 of the filler 24. The surface layer 12 may be applied via spray deposition, via infiltration of metallic powder or via another appropriate method. If infiltration of loose metallic powder is used, the powder may be consolidated through application of an appropriate heat treatment or HIPing, or both. The heat treatment serves to consolidate the powder via a sintering process whereby individual powder particles become agglomerated. The HIP (Hot Isostatic Pressing) process will further increase the density the powder to achieve near 100% density. Typically, these process are performed at temperatures in excess of 1000 C. (1832 F.). In the case of the HIP process, pressures of about 100 MPa (approx. 15 ksi) may be utilized. Processing cycle times may be between about 3 and 5 hours.

The remaining filler material 24 may then be removed from the porous structure 18 to leave an unfilled foam material 14. The unfilled foam material with the surface layer 12 may be usable in advanced cooling systems of turbine engines and turbine airfoils of turbine engines.

Figure 4:
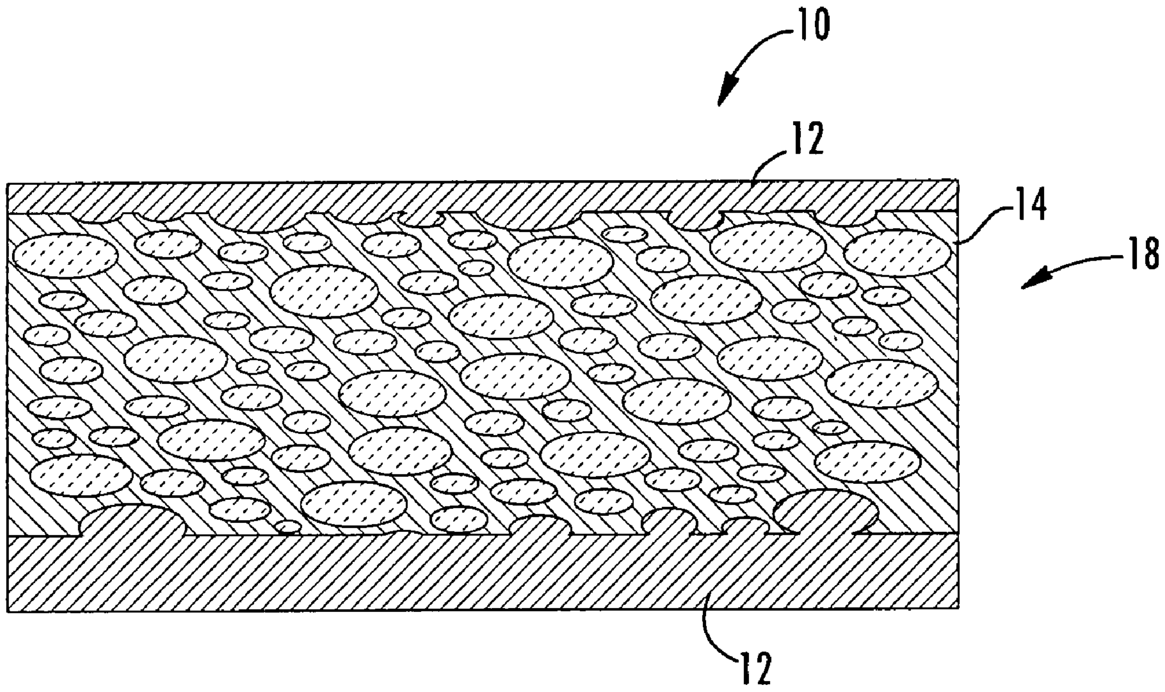
FIG. 4 is a partial cross-sectional view of the metal foam with a surface layer applied to two opposing surfaces, whereby the surface layer is attached to the porous structure at least in part due to mechanical interaction with the portions of the porous structure extending outwardly from the newly formed outer surface of the filler.

In at least one embodiment, as shown in FIG. 4, the foam material 14 may be formed from a plate-like shape in which the foam material 14 may include two planar surfaces that are generally opposite to each other and on opposite sides of the foam material 14 from each other. The surface layer 12 may be applied to the outer surfaces 16 of the filler 24 and exposed portions of the porous structure 18. Thus, the surface layer 12 may be applied to two opposite surface layers.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of forming a surface coating on an outer surface of foam, comprising:

removing filler from the outer surface of the foam to expose a porous structure of the foam, whereby portions of the porous structure extend outwardly from a newly formed outer surface of the filler;

applying a surface layer to the outer surface of the filler and exposed portions of the porous structure, whereby the surface layer is attached to the porous structure at least in part due to mechanical interaction with the portions of the porous structure extending outwardly from the newly formed outer surface of the filler; and removing the filler material from the porous structure.

2. The method of claim 1, further comprising infiltrating the porous structure with the filler before removing the filler from the outer surface of the foam.

3. The method of claim 2, wherein infiltrating the porous structure with the filler comprises infiltrating the porous structure with a ceramic filler.

4. The method of claim 1, wherein applying a surface layer to the outer surface of the filler and exposed portions of the porous structure comprises applying the surface layer via spraying.

5. The method of claim 1, wherein applying a surface layer to the outer surface of the filler and exposed portions of the porous structure comprises applying the surface layer via infiltration of metallic powder.

6. The method of claim 5, further comprising applying a heat treatment to the powder.

7. The method of claim 6, further comprising applying HIPing to the powder.

8. The method of claim 1, wherein removing the filler material from the porous structure comprises leaching the filler material from the porous structure.

9. The method of claim 1, wherein the porous structure is a metal foam formed from a nickel based superalloy.

10. The method of claim 1, wherein the porous structure is a metal foam formed from FeCrAl.

11. The method of claim 1, wherein applying a surface layer to the outer surface of the filler and exposed portions of the porous structure comprises applying the surface layer to two outer surfaces of the porous structure, wherein the two outer surfaces of the porous structure are generally planar and generally opposite to each other.

12. The method of claim 1, wherein the porous structure is a portion of a cooling system of a turbine engine.

13. A method of forming a surface coating to an outer surface of a metallic foam of a turbine engine cooling system, comprising:

infiltrating a porous structure with a ceramic filler forming a portion of the turbine engine cooling system with a removable filler;

removing filler from the outer surface of the foam to expose a porous structure of the foam, whereby portions of the porous structure extend outwardly from a newly formed outer surface of the filler;

applying a surface layer to the outer surface of the filler and exposed portions of the porous structure, whereby the surface layer is attached to the porous structure at least in part due to mechanical interaction with the portions of the porous structure extending outwardly from the newly formed outer surface of the filler; and removing the filler material from the porous structure.

14. The method of claim 13, wherein applying a surface layer to the outer surface of the filler and exposed portions of the porous structure comprises applying the surface layer via spraying.

15. The method of claim 13, wherein applying a surface layer to the outer surface of the filler and exposed portions of the porous structure comprises applying the surface layer via infiltration of metallic powder.

16. The method of claim 15, further comprising applying a heat treatment to the powder.

17. The method of claim 16, further comprising applying HIPing to the powder.

18. The method of claim 13, wherein the porous structure is a metal foam selected from the group consisting of a nickel based superalloy and FeCrAl.

19. The method of claim 13, wherein applying a surface layer to the outer surface of the filler and exposed portions of the porous structure comprises applying the surface layer to two outer surfaces of the porous structure, wherein the two outer surfaces of the porous structure are generally planar and generally opposite to each other.

* * * * *